US011663372B2

(12) United States Patent
Chong et al.

(10) Patent No.: US 11,663,372 B2
(45) Date of Patent: May 30, 2023

(54) SPATIALLY-AWARE DETECTION OF TRAPPED SUPPORT AREAS IN 3D PRINTING

(71) Applicant: SIEMENS INDUSTRY SOFTWARE INC., Plano, TX (US)

(72) Inventors: Chee-Keong Chong, Irvine, CA (US); Zhi Li, Cypress, CA (US); Lei Yang, Alamitos, CA (US)

(73) Assignee: Siemens Industry Software Inc., Plano, TX (US)

( * ) Notice: Subject to any disclaimer, the term of this patent is extended or adjusted under 35 U.S.C. 154(b) by 918 days.

(21) Appl. No.: 16/121,410

(22) Filed: Sep. 4, 2018

(65) Prior Publication Data

US 2020/0074016 A1    Mar. 5, 2020

(51) Int. Cl.
| | | |
|---|---|---|
| *B33Y 50/00* | (2015.01) | |
| *B29C 64/386* | (2017.01) | |
| *G06F 30/00* | (2020.01) | |
| *G06F 30/10* | (2020.01) | |
| *G06T 17/00* | (2006.01) | |
| *G06F 119/18* | (2020.01) | |

(52) U.S. Cl.
CPC ............ *G06F 30/00* (2020.01); *B29C 64/386* (2017.08); *B33Y 50/00* (2014.12); *G06F 30/10* (2020.01); *G06T 17/00* (2013.01); *G06F 2119/18* (2020.01)

(58) Field of Classification Search
CPC ...... G06F 30/00; G06F 2119/18; G06F 30/10; B33Y 50/00; B29C 64/386; G06T 17/00
USPC .......................................................... 703/1
See application file for complete search history.

(56) References Cited

U.S. PATENT DOCUMENTS

| 8,059,122 B1 | 11/2011 | MacGillivray |
| 9,171,400 B2 | 10/2015 | Bonner et al. |
| (Continued) | | |

FOREIGN PATENT DOCUMENTS

| CN | 1082739 A | 2/1994 |
| CN | 105900145 A | 8/2016 |
| (Continued) | | |

OTHER PUBLICATIONS

Rutuja Samant et al., "Octree data structure for support accessibility and removal analysis in additive manufacturing"; Additive Manufacturing, vol. 22, Aug. 1, 2018 (Year: 2018).*

(Continued)

*Primary Examiner* — John E Johansen
*Assistant Examiner* — Nupur Debnath (57) ABSTRACT

A computer-aided design (CAD) system may support spatially-aware detection of trapped support areas in 3D printing. The CAD system may detect trapped support areas in the surface mesh in that detected trapped support area do not have linear access to an opening in the surface mesh, including by surrounding the surface mesh with a virtual bounding box that encloses the surface mesh, mapping the virtual bounding box and surface mesh into a 3D cube space, and tracking mesh cubes and bounding cubes of the 3D cube space. For a given mesh face of the surface mesh, The CAD system may determine whether the given mesh face is part of a trapped support area by projecting a ray from the given mesh face and assessing the given mesh face as part of a trapped support area based on the ray passing through a mesh cube or a bounding cube.

19 Claims, 8 Drawing Sheets

(56) References Cited

U.S. PATENT DOCUMENTS

| | | | |
|---|---|---|---|
| 10,065,374 B2* | 9/2018 | Ho et al. | B33Y 10/00 |
| 10,471,698 B2* | 11/2019 | Prasad et al. | B29C 64/165 |
| 10,976,722 B2* | 4/2021 | Radjou | G06F 30/23 |
| 2003/0080957 A1 | 5/2003 | Stewart et al. | |
| 2008/0043018 A1 | 2/2008 | Keller et al. | |
| 2008/0297507 A1 | 12/2008 | Chen | |
| 2009/0174720 A1 | 7/2009 | Brown | |
| 2010/0228369 A1* | 9/2010 | Eggers | G05B 15/02 700/98 |
| 2014/0324204 A1* | 10/2014 | Vidimce et al. | G06F 17/50 |
| 2015/0170013 A1* | 6/2015 | Wilson | G05B 19/188 235/468 |
| 2015/0190971 A1* | 7/2015 | Musuvathy | B29C 64/386 700/98 |
| 2017/0129185 A1* | 5/2017 | Buller | B29C 64/268 |
| 2017/0372480 A1* | 12/2017 | Anand | G06T 7/11 |
| 2020/0019142 A1* | 1/2020 | Ulu et al. | G05B 19/4099 |

FOREIGN PATENT DOCUMENTS

| | | | | |
|---|---|---|---|---|
| DE | 102011015893 A1 | 10/2012 | | |
| GB | 201807855 | 6/2018 | | |
| WO | WO-2004110309 A2 * | 12/2004 | | G06T 17/10 |

OTHER PUBLICATIONS

Jayanth Majhi et al., "Minimizing support structures and trapped area in two-dimensional layered manufacturing"; Computational Geometry, vol. 12, No. 3-4, Apr. 1, 1999, pp. 241-267 (Year: 1999).*

Saish Tedia and Christopher B. Williams; Manufacturability Analysis Tool for Additive Manufacturing Using Voxel-Based Geometric Modeling; Proceedings of the 27th Annual International Solid Freeform Fabrication Symposium—An Additive Manufacturing Conference (Year: 2016).*

Jingchao Jiang, Xun Xu and Jonathan Stringer; Support Structures for Additive Manufacturing: A Review; Journal of Manufacturing and Materials Processing; (Year: 2018).*

Saish Tedia et al.; "Manufacturability Analysis Tool for Additive Manufacturing Using Voxel-Based Geometric Modeling"; Proceedings of the 27th Annual International Solid Freeform Fabrication Symposium—An Additive Manufacturing Conference Reviewed Paper (Year: 2016).*

Patil and Ravi; "Voxel-based Representation, Display and Thickness Analysis of Intricate Shapes"; Ninth International Conference on Computer Aided Design and Computer Graphics (CAD/CG 2005) (Year: 2005).*

Ahsan et al. "Honeycomb pattern on thin wall object with grain based 3d printing"; 46th SME North American Manufacturing Research Conference, NAMRC 46 (Year: 2018).*

Franklin et al.; "Parallel intersection detection in massive sets of cubes"; BigSpatial'17, Nov. 7-10, 2017 (Year: 2017).*

Samant, Rutuja, et al. "Octree data structure for support accessibility and removal analysis in additive manufacturing." Additive Manufacturing 22 (2018). pp. 618-633. (Year: 2018).*

Rohan Vaidya and Sam Anand, "Optimum Support Structure Generation for Additive Manufacturing Using Unit Cell Structures and Support Removal Constraint"; 44th Proceedings of the North American Manufacturing Research Institution of SME,vol. 5; No. 2016, Jun. 27, 2016, pp. 1043-1059.

Rutuja Samant et al., "Octree data structure for support accessibility and removal analysis in additive manufacturing"; Additive Manufacturing, vol. 22, Aug. 1, 2018, pp. 618-633.

Jayanth Majhi et al., "Minimizing support structures and trapped area in two-dimensional layered manufacturing"; Computational Geometry, vol. 12, No. 3-4, Apr. 1, 1999, pp. 241-267.

Rutuja Samant et al: "Octree data structure for support accessibility andremoval analysis in additive manufacturing "; Additive Manufacturing; vol. 22; pp. 618-633; XP055668744; NL; ISSN: 2214-8604; DOI: 10.1016/j.addma.2018.05.031.

* cited by examiner

SPATIALLY-AWARE DETECTION OF TRAPPED SUPPORT AREAS IN 3D PRINTING

BACKGROUND

Computer systems can be used to create, use, and manage data for products and other items. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate design and simulated testing of product structures.

SUMMARY

Disclosed implementations include systems, methods, devices, and logic that support spatially-aware detection of trapped support areas in 3D printing.

In one example, a method may be performed, executed, or otherwise carried out by a CAD system. The method may include accessing a surface mesh of an object to be constructed by a 3-dimensional (3D) printer and detecting a trapped support areas in the surface mesh in that detected trapped support areas do not have linear access to an opening in the surface mesh. Detecting the trapped support areas may include surrounding the surface mesh with a virtual bounding box that encloses the surface mesh; mapping the virtual bounding box and surface mesh into a 3D cube space; tracking mesh cubes of the 3D cube space that include at least a portion of a mesh face of the surface mesh; tracking bounding cubes of the 3D cube space that include at least a portion of the virtual bounding box; and for a given mesh face of the surface mesh, determining whether the given mesh face is part of a trapped support area by projecting a ray from the given mesh face and assessing the given mesh face as part of a trapped support area based on the ray passing through a mesh cube or a bounding cube. The method may further include providing a trapped support alert indicative of the trapped support areas detected in the surface mesh and obtaining a redesigned surface mesh that accounts for the trapped support areas.

In another example, a system may include a mesh access engine and a trapped support detection engine. The mesh access engine may be configured to access a surface mesh of an object to be constructed by a 3D printer. The trapped support detection engine may be configured to map the surface mesh into a 3D cube space; track mesh cubes of the 3D cube space that include at least a portion of a mesh face of the surface mesh; determine whether a given mesh face of the surface mesh is part of a trapped support area by selectively performing intersection checks to other mesh faces of the surface mesh based on rays projected from the given mesh face passing through mesh cubes of the 3D cube space; provide a trapped support alert indicative of a trapped support area detected in the surface mesh; and obtain a redesigned surface mesh that accounts for the trapped support area.

In yet another example, a non-transitory machine-readable medium may store instructions executable by a processor. Upon execution, the instructions may cause the processor or a CAD system to access a surface mesh of an object to be constructed by a 3D printer and detect trapped support areas in the surface mesh in that detected trapped support area do not have linear access to an opening in the surface mesh. Such detection may include surrounding the surface mesh with a virtual bounding box that encloses the surface mesh; mapping the virtual bounding box and surface mesh into a 3D cube space; tracking mesh cubes of the 3D cube space that include at least a portion of a mesh face of the surface mesh; tracking bounding cubes of the 3D cube space that include at least a portion of the virtual bounding box; and for a given mesh face of the surface mesh, determining whether the given mesh face is part of a trapped support area by projecting a ray from the given mesh face and assessing the given mesh face as part of a trapped support area based on the ray passing through a mesh cube or a bounding cube. Execution of the instructions may further cause the processor or CAD system to provide a trapped support alert indicative of the trapped support areas detected in the surface mesh and obtain a redesigned surface mesh that accounts for the trapped support areas.

BRIEF DESCRIPTION OF THE DRAWINGS

Certain examples are described in the following detailed description and in reference to the drawings.

DETAILED DESCRIPTION

Additive manufacturing (sometimes referred to as 3D printing) may be performed through use of 3D printers that can construct objects through material deposition. As 3D printing typically involves material deposition on a layer by layer basis, certain object structures (e.g., overhangs) may require use of physical supports during 3D printing to properly construct the object. Issues arise when support areas are trapped or enclosed during 3D printing such that inserted supports to construct an object become inaccessible or otherwise incapable of removal. In that regard, trapped supports may include supports inserted during 3D printing that are completely or partially enclosed such that the inserted supports cannot be removed by 3D printing or additive manufacturing post processes.

A trapped support area may thus refer to areas or surfaces present in an object or object design in which a support is required for 3D printing, but such a support would be trapped upon the 3D printing of the object. In some"

examples, trapped support areas may refer to any area of an object that does not have linear access to an opening in the object. Thus, any support inserted into a trapped support area would be inaccessible, i.e., "trapped", upon 3D construction of an object.

Detection of trapped support areas in an object may be performed during a CAD design phase to address potential trapping issues prior to physical construction of an object by a 3D printer. However, trapped support detection processes can be inefficient and computationally intensive. Many trapped support techniques involve analyzing a surface mesh of an object, which may be comprised of a large number of mesh faces (e.g., triangles or other shapes that together model a surface of the object). Such surface mesh analyses can be complex and resource intensive as a result of CAD models developed with increasing complexity and granularity.

Some trapped support detection techniques may involve brute force computations, for example by projecting rays from mesh faces of an object design and performing intersection checks with every other mesh of the object design. If a projected ray for a given mesh face is determined not to intersect with every other mesh face in the object, then such brute force techniques may determine that the given mesh face is not part of a trapped support area. However, such a determination comes at the cost of numerous intersection check computations, possibly for every other mesh face of an object design, many of which are irrelevant or impossible to reach by the projected ray. As object designs increase in complexity having surfaces with mesh faces numbering in the millions and more, brute force techniques for trapped support detection will only increase in inefficiency and resource consumption.

The disclosure herein may provide systems, methods, devices, and logic for spatially-aware detection of trapped support areas in 3D printing. In particular, the trapped support detection features described herein may selectively perform intersection checks for mesh faces spatially proximate to rays projected from a given mesh face of an object. In other words, the features described herein may provide intelligent or spatially-aware intersection check computations during trapped support detections. As described in greater detail below, the trapped support detection features disclosed herein may include use of a mapped 3D space to characterize and correlate specific portions of the 3D space to specific mesh faces in an object design, which may allow for efficient and speedy determinations of relevance for trapped support detections.

For instance, during ray projection, intersection checks may be performed in a selective manner to relevant mesh faces that are proximate (and thus potentially blocking or trapping) to a ray projected from a given mesh face being analyzed. Thus, instead of performing intersection checks indiscriminately for all (or even most) of the mesh faces of an object, the features described herein may provide spatially aware calculations to a much smaller, relevant subset of the mesh faces of an object. As such, detection of trapped support areas may be performed with increased computational efficiency and effectiveness. In some examples, the trapped support detection features described herein may result in CAD computing systems operating with 10×, 100×, or 1000× efficiency increases as compared to brute-force techniques, possibly more as 3D object designs increase in complexity.

Figure 1:
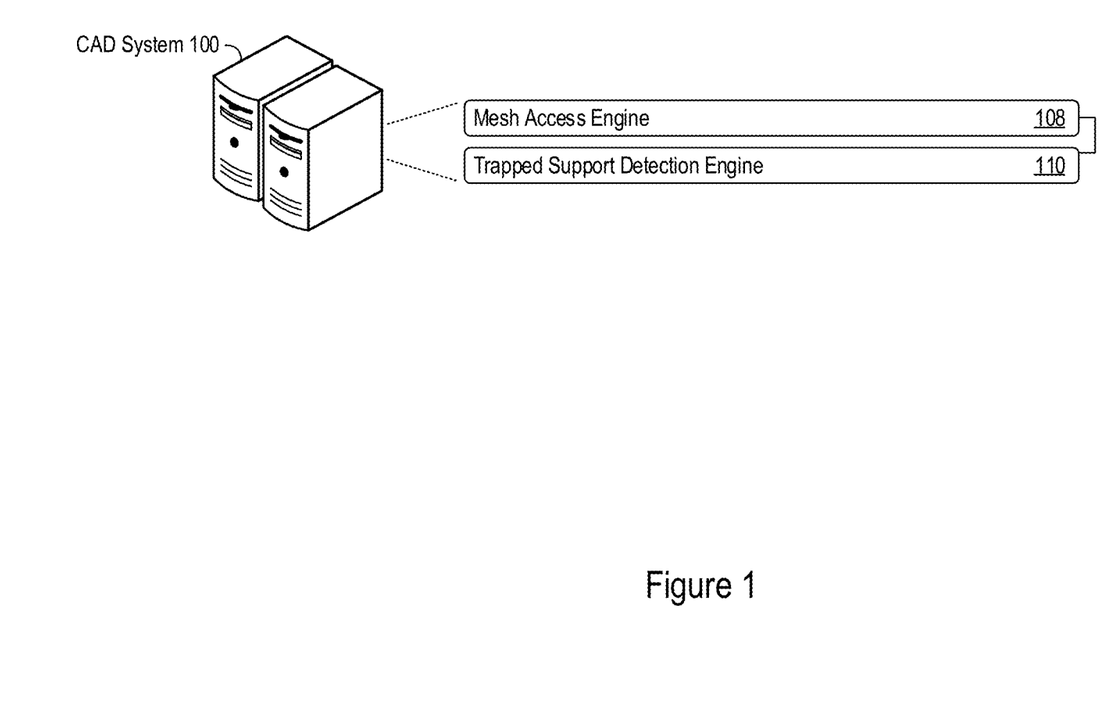
FIG. 1 shows an example of a CAD system that supports spatially-aware detection of trapped support areas in 3D printing.

FIG. 1 shows an example of a CAD system 100 that supports spatially-aware detection of trapped support areas in 3D printing. The CAD system 100 may take the form of a computing system, including a single or multiple computing devices such as application servers, compute nodes, desktop or laptop computers, smart phones or other mobile devices, tablet devices, embedded controllers, and more. In some implementations, the CAD system 100 implements a CAD tool or CAD program through which a user may design and simulate testing of product structures.

As described in greater detail herein, the CAD system 100 may perform trapped support detections for a 3D surface mesh in a spatially-aware manner. Doing so may allow the CAD system 100 to selectively perform intersection checks between a given mesh face and other relevant mesh faces of an object with the potential or possibility of blocking the given surface mesh from support removal. The CAD system 100 may utilize various techniques to provide intelligent, spatially-aware intersection checks, including by mapping the surface mesh to a 3D space by which various spaces of the 3D space can be characterized as including one or more mesh faces of an object or as being outside of the object (and thus accessible when mesh faces of the object have linear access to such portions). Space indexing may be utilized by the CAD system 100 to identify such characterized spaces with increased speed, which may then support intelligent and efficient intersection checks and trapped support detections.

As an example implementation, the CAD system 100 shown in FIG. 1 includes a mesh access engine 108 and a trapped support detection engine 110. The CAD system 100 may implement the engines 108 and 110 (and components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the CAD system 100 implements multiple engines using the same computing system features or hardware components (e.g., a common processor or a common storage medium).

In operation, the mesh access engine 108 may access a surface mesh of an object to be constructed by a 3D printer. The trapped support detection engine 110 may map the surface mesh into a 3D cube space and track mesh cubes of the 3D cube space that include at least a portion of a mesh face of the surface mesh. The trapped support detection engine 110 may further determine whether a given mesh face of the surface mesh is part of a trapped support area by selectively performing intersection checks to other mesh faces of the surface mesh based on rays projected from the given mesh face passing through mesh cubes of the 3D cube space. In some implementations, the trapped support detection engine 110 may also assess when given mesh faces are not part of a trapped support area, doing so by surrounding the surface mesh with a virtual bounding box, tracking bounding cubes of the 3D cube space that include at least a portion of the virtual bounding box, and determining that a given mesh face of the surface mesh is not part of a trapped support area responsive to a determination that a ray projected from the given mesh face passes through a bounding cube.

These and other example features of trapped support area detections according to the present disclosure are described in greater detail next.

Figure 2:
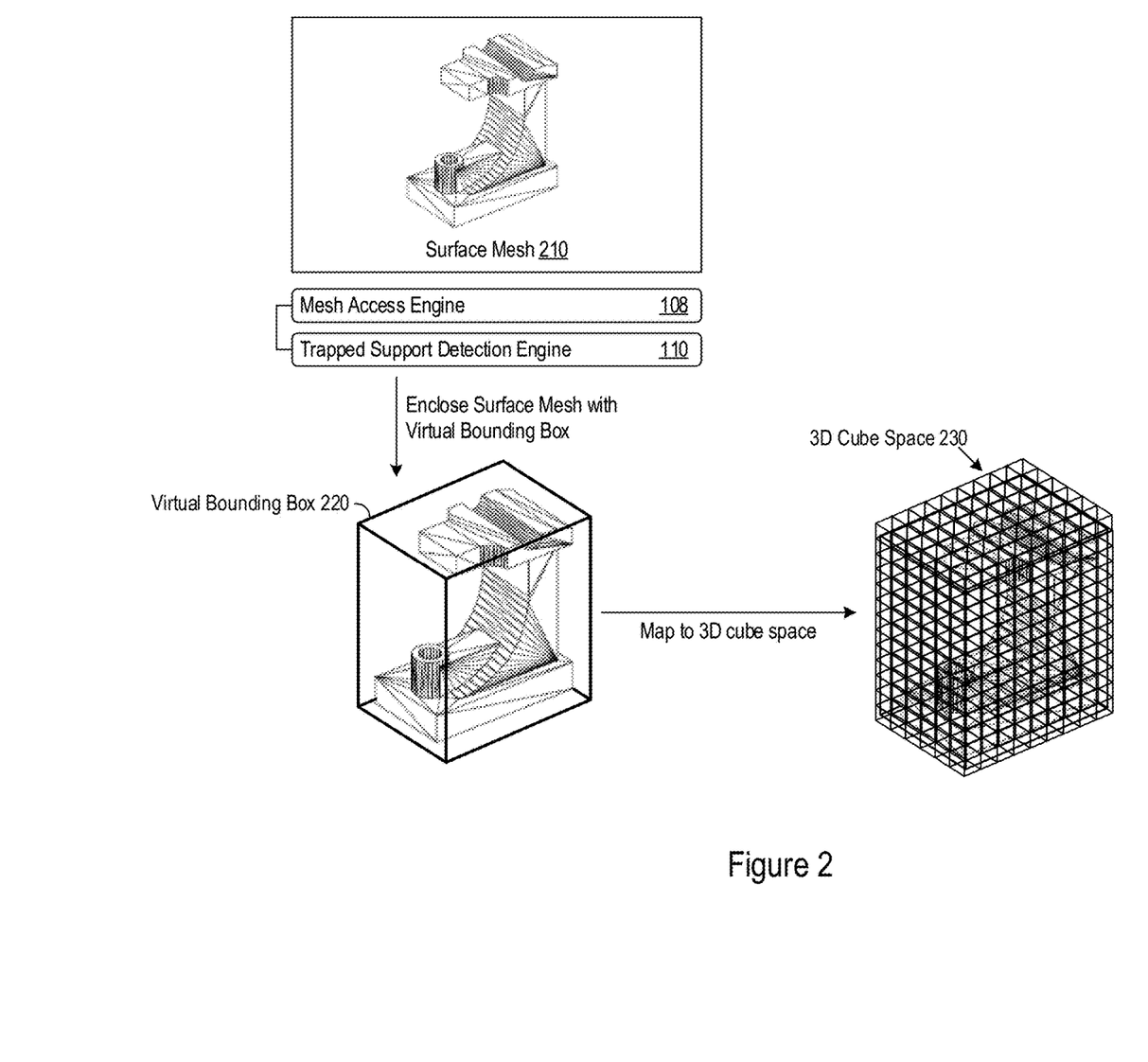
FIG. 2 shows an example of surface mesh access and processing to support spatially-aware detection of trapped support areas in an object design.

FIG. 2 shows an example of surface mesh access and processing to support spatially-aware detection of trapped support areas in an object design. In FIG. 2, the mesh access engine 108 accesses a surface mesh 210. The surface mesh 210 may model the surface of a physical object to be constructed via 3D printing, doing so in the form of polygons (e.g., mesh faces formed by vertices and edges in an object design) that collectively form the object surface.

The trapped support detection engine 110 may process the surface mesh 210 to support spatially-aware detection of trapped support areas. As an example processing, the trapped support detection engine 110 may enclose the surface mesh 210 with a bounding shape. The bounding shape may, in effect, outline an area external to the object surface represented by the surface mesh 210. Accordingly, any mesh face with linear access to the bounding shape may be determined to be not trapped within the object (and thus not trapped support areas, as inserted supports for such areas are accessible for removal post 3D construction). By representing areas external to an object via a bounding shape, the trapped support detection engine 110 may support characterization of spaces relative to the object, which may allow for spatially-aware determinations that mesh faces of the surface mesh 210 are not in trapped support areas.

In FIG. 2, the trapped support detection engine 110 surrounds the surface mesh 210 with the virtual bounding box 220. The trapped support detection engine 110 may do so by adding rectangular shape elements into a CAD design that together enclose the surface mesh 210. In particular, the trapped support detection engine 110 may form the virtual bounding box 220 to be separate from the surface mesh 210 in that no portion of the virtual bounding box 220 contacts the surface mesh 210. Doing so may ensure a proper representation of areas external to the represented object. Although illustrated in the example shown in FIG. 2 as a rectangular shape, the trapped support detection engine 110 may surround the surface mesh 210 with any suitable shape that is separate from and encloses the surface mesh 210.

As another example of processing, the trapped support detection engine 110 may map the surface mesh 210 (and virtual bounding box 220) into a 3D space. The trapped support detection engine 110 may do so by subdividing a CAD design into virtual 3D shapes that together form the 3D space. One example of such mapping is to a 3D cube space. To illustrate through FIG. 2, the trapped support detection engine 110 may subdivide the virtual bounding box 220 and surface mesh 210 into a 3D cube space 230 comprised of 3D cubes. Each 3D cube includes a specific portion of space in the 3D cube space and may include portions of the virtual bounding box 220, one or more mesh faces of the surface mesh 210, or neither.

3D cube spaces are used as continuing example herein. However, the trapped support detection engine 110 may map the surface mesh 210 and virtual bounding box 220 into 3D spaces of any type of 3D shapes or polygons (e.g., 3D rectangles, 3D diamonds, 3D triangles, etc.), so long as each portion of the virtual bounding box 220 and surface mesh 210 are mapped to specific 3D shapes in the mapped 3D space. Any of the various 3D cube features described herein may be consistently applied by the trapped support detection engine 110 for any form of 3D shapes in mapped 3D spaces.

In some implementations, the trapped support detection engine 110 sets a granularity of the mapped 3D space. The granularity may specify a size of the 3D shapes that form the 3D space. In FIG. 2, mapping of the virtual bounding box 220 and the surface mesh 210 to the 3D cube space 230 by the trapped support detection engine 110 may include setting cube parameters of the 3D cube space 230 to be a threshold size proportional to a granularity of the surface mesh 210. As examples, the trapped support detection engine 110 may set the cube size of the 3D cube space to be identical, proportional, or at an offset as to a surface mesh granularity (e.g., minimum mesh face size, average mesh face size, maximum mesh face size, etc.). As such, the trapped support detection engine 110 may correlate the mapped 3D cube space 230 to be consistent with a mesh quality of the surface mesh 210.

As a particular example, the trapped support detection engine 110 may set a granularity (e.g., cube size) of the mapped 3D cube space 230 to be a specified percentage larger than the granularity of the surface mesh 210 (e.g., 125%). By doing so, the trapped support detection engine 110 may ensure that a given cube in the 3D cube space 230 can include the entirety of a single mesh face and (optionally, depending on the threshold percentage) ensure that a given cube cannot include multiple mesh faces in whole. Put another way, the trapped support detection engine 110 may set a cube granularity for the mapped 3D cube space such that an entire single mesh face can be located within a single 3D cube.

By ensuring that a single cube in the 3D cube space 230 can enclose a particular mesh face in whole, the trapped support detection engine 110 may increase computation efficiencies. Intersection checks of the particular mesh face can be performed a single time when enclosed in the single cube, as opposed to being enclosing for multiple cubes. This may not be the case when the cube granularity of the 3D cube space 230 is smaller than the granularity of the surface mesh 210, intersection checks for a particular mesh face may be computed multiple times for each of the multiple cubes that the particular mesh face is included in. Depending on particular cube boundaries however, a given cube in the 3D cube space 230 can nonetheless include portions of multiple mesh faces.

In some implementations, the trapped support detection engine 110 may ensure that no 3D cube contains both a portion of a mesh face and a portion of the virtual bounding box 220. In that regard, the trapped support detection engine 110 may ensure that a cube cannot be both characterized as including a mesh face and including a portion of the virtual bounding box 220. Separate characterizations for mesh cubes and bounding cubes may provide a mechanism for the trapped support detection engine 110 to properly characterize various portions of a 3D space, supporting spatially-aware trapped support detections. To ensure no 3D cube includes both a portion of the virtual bounding box 220 and any portion of a mesh face, the trapped support detection engine 110 may control the surrounding of the virtual bounding box 220 to, for example, be a threshold distance from the surface mesh 210 that is at least the cube granularity of the 3D cube space 230. In other examples, the trapped support detection engine 110 may re-map the 3D cube space 230 if any of the mapped cubes were to include both a portion of the virtual bounding box 220 and any portion of a mesh face.

By mapping the surface mesh 210 and virtual bounding box 220 to a 3D cube space 230, the trapped support detection engine 110 may differentiate certain spaces in a CAD design to support spatially-aware detection of trapped support areas. Some example differentiations are described next in FIG. 3.

Figure 3:
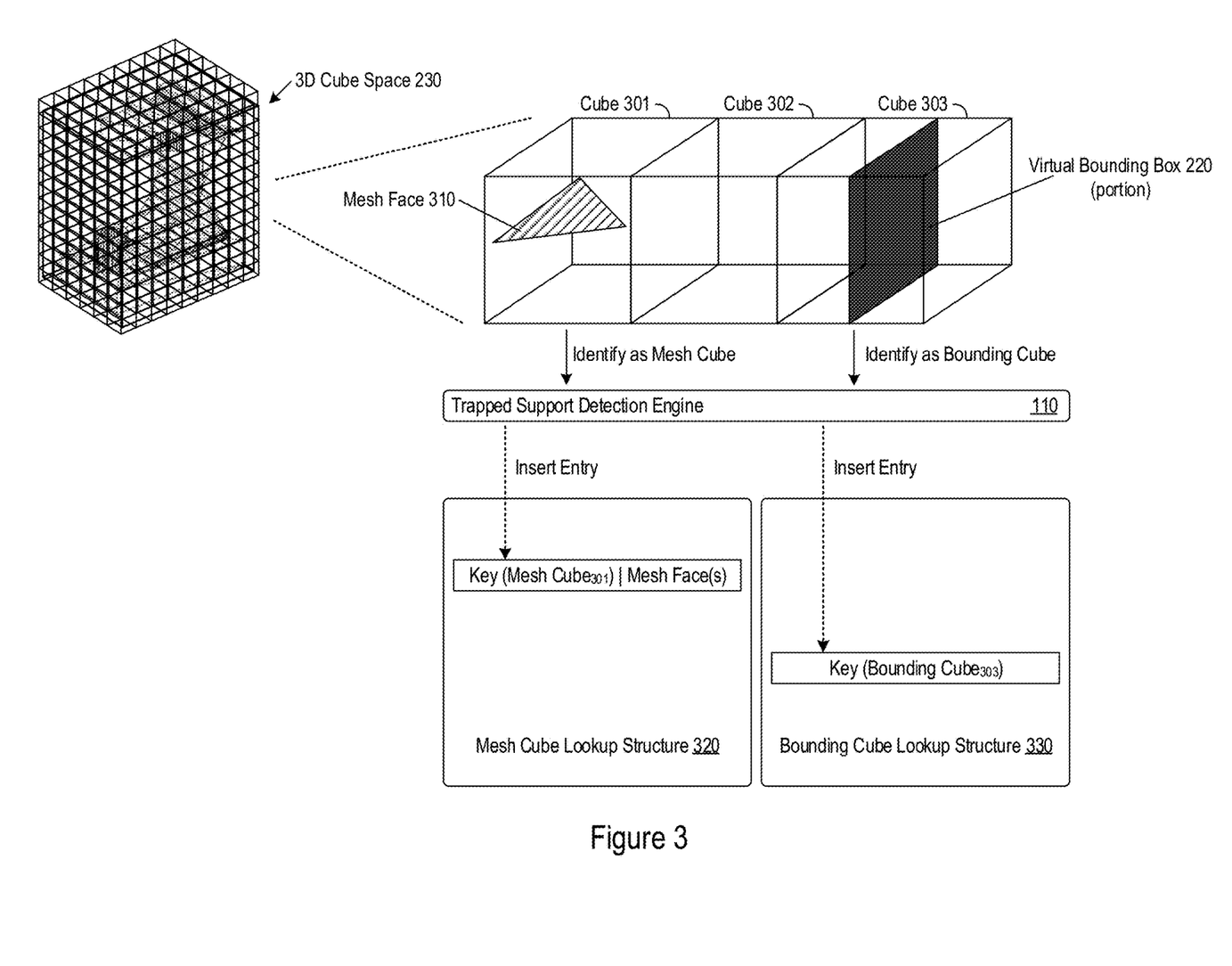
FIG. 3 shows an example of spatial differentiations by a trapped support detection engine to support detection of trapped support areas.

FIG. 3 shows an example of spatial differentiations by the trapped support detection engine 110 to support detection of trapped support areas. In particular, the trapped support detection engine 110 may differentiate between 3D spaces (e.g., cubes) in which mesh faces are located, the virtual bounding box 220 is located, or are neither. In doing so, the trapped support detection engine 110 may track mesh cubes that include at least one mesh face of the surface mesh 210 as well as bounding cubes that include at least a portion of the virtual bounding box 220.

As used herein, a mesh cube may refer to any cube in a mapped 3D cube space that includes a mesh face, whether partially or in whole. A mesh cube may thus include a portion of a mesh face, a whole mesh face, portions of multiple mesh faces, portions of multiple faces and a whole mesh face, or other mesh face combinations depending on the granularity of a mapped 3D cube space.

A bounding cube may refer to any cube in the mapped 3D cube space that includes at least a portion of a bounding shape, such as the virtual bounding box 220.

To provide a concrete differentiation illustration, FIG. 3 depicts cubes 301-303 of the 3D cube space 230. Cube 301 includes the mesh face 310 (in whole), and accordingly the trapped support detection engine 110 may identify cube 301 as a mesh cube. Cube 302 does not include any portion of a mesh face nor does it include any portion of the virtual bounding box 220. As such, the trapped support detection engine 110 identifies cube 302 as neither a mesh cube nor a bounding cube (or, put another way, an empty cube). Cube 303 includes a portion of the virtual bounding box 220 (depicted in black). Thus, the trapped support detection engine 110 identifies cube 303 as a bounding cube.

The trapped support detection engine 110 need not analyze every cube of the 3D cube space 230 to identify mesh cubes and bounding cubes. For example, the trapped support detection engine 110 may parse the surface mesh 210 to determine the specific set of cubes in which mesh faces of the surface mesh 210 are located within to specifically identify mesh cubes. The trapped support detection engine 110 may specifically identify bounding cubes as well, and need not analyze the remaining cubes of the 3D cube space 230, that is empty cubes that do not contain any portion of a mesh face and do not include any portion of the virtual bounding box 220. Such empty cubes may be cubes inside the surface of a modeled object or cubes external to the object between the virtual bounding box 220.

In some implementations, the trapped support detection engine 110 can identify mesh cubes via vertices of a mesh face such as surface meshes composed of triangle mesh faces or other polygon mesh faces. To do so, the trapped support detection engine 110 may set a cube granularity of the 3D cube space such that a cube can include an entire mesh face. In such examples, the cube(s) of the 3D cube space 230 that include the vertices of a given mesh face may be identified by the trapped support detection engine 110 as a mesh cube (or mesh cubes). Such an identification may include determining the vertices of each mesh face (e.g., in a 3D coordinate form) and identifying which cubes of the 3D cube space 230 the mesh face vertices are located in. The trapped support detection engine 110 may thus identify the mesh cubes of a 3D cube space 230 as the cubes that include at least one vertex of a mesh face in the surface mesh 210.

To identify bounding cubes, the trapped support detection engine 110 may determine which cubes include portions of the virtual bounding box 220. In some implementations, the trapped support detection engine 110 maps 3D cube space 230 such that the virtual bounding box 220 forms the outer boundary of the 3D cube space 230. As such, the outer cubes of the 3D cube space 230 may together form the space that includes the virtual bounding box 220, and thus form the set of bounding cubes for the 3D cube space 230 identified by the trapped support detection engine 110.

The trapped support detection engine 110 may track identified mesh cubes and bounding cubes in various ways. In some implementations, the trapped support detection engine 110 may track mesh cubes and bounding cubes via keys unique to each cube in a 3D cube space (which may also be referred to herein as a cube keys). The trapped support detection engine 110 may compute or otherwise assign a unique cube key to each cube of the 3D cube space 230. Cube keys may be computed as a concatenation of the 3D coordinates of a particular point in a cube (e.g., cube corner with the lowest or highest x, y, and z coordinate values, cube center, etc.). As another example, the trapped support detection engine 110 may apply a cube key function to transform a cube coordinate to an integer or other value unique to each cube, which may provide a logical coordinate for a given cube of the 3D cube space 230. Cube keys may be reversible in that the trapped support detection engine 110 may identify the particular cube in the 3D cube space 230 represented by a particular cube key.

Using cube keys, the trapped support detection engine 110 may track mesh cubes and bounding cubes. For instance, the trapped support detection engine 110 may maintain one or more lookup structures through which identified mesh cubes or bounding cubes are tracked. In the example shown in FIG. 3, the trapped support detection engine 110 maintains a mesh cube lookup structure 320 and a bounding cube lookup structure 330. The lookup structures 320 and 330 may take the form of any suitable data structure capable to store and retrieve data, such as hash tables, lookup tables, relational database, and the like. Although illustrated separately in FIG. 3, the lookup structures 320 and 330 may be implemented as a single data structure, with differentiating entries or entry values for mesh cubes and bounding cubes (e.g., via a flag value included as part of entries). As another example, the lookup structures 320 and 330 may be logically separate, but are implemented sharing an underlying data structure or structure components.

The mesh cube lookup structure 320 may store entries for identified mesh cubes in the 3D cube space 230. An entry in the mesh cube lookup structure 320 may include the cube key for a particular mesh cube, through which subsequent entry lookup can be performed by the trapped support detection engine 110. In some implementations, an entry in the mesh cube lookup structure 320 may further identify the specific mesh face(s) included (e.g., located) in a given mesh cube. Such mesh face identifications in entries of the mesh cube lookup structure 320 may be later used during trapped support detections to identify spatially proximate mesh faces to perform intersection checks for. In FIG. 3, the trapped support detection engine 110 inserts an entry into the mesh cube lookup structure 320 for cube 301 (identified as a mesh cube). This inserted entry may include the cube key for cube 301 as well as an identification of mesh face 310 included in cube 301 (and any other mesh faces partially included in cube 301, though not illustrated in FIG. 3).

The bounding cube lookup structure 330 may likewise store entries inserted by the trapped support detection engine 110, particularly for bounding cubes identified in the 3D cube space 230. An entry in the bounding cube lookup structure 330 may include the cube key for a particular bounding cube, through entries inserted into the bounding cube lookup structure 330 need not identify the specific portion of the virtual bounding box 220 included in respective bounding cubes. In FIG. 3, the trapped support detection engine 110 inserts an entry into the bounding cube lookup structure 330 for cube 303 (identified as a bounding cube) that includes the cube key for cube 303.

Upon populating the mesh cube lookup structure 320 and the bounding cube lookup structure 330, the trapped support detection engine 110 may perform trapped support detections for the surface mesh 210. In some implementations, the trapped support detection engine 110 may detect trapped support areas on a mesh face-by-mesh face basis. For a given mesh face, the trapped support detection engine 110 may project rays from various points to detect whether the given mesh face has linear access to an area exterior to the object represented by the surface mesh 210.

In performing such trapped support detections, the trapped support detection engine 110 may spatially characterize various spaces of a CAD design. In effect, lookups into the mesh cube lookup structure 320 may be utilized to characterize cubes in the 3D cube space 230 as mesh cubes. In a consistent manner, lookups into the bounding cube lookup structure 330 may be utilized to characterize cubes as bounding cubes. Such characterizations may provide spatial-awareness for ray projections from a given surface mesh, allowing the trapped support detection engine 110 to identify spatial characteristics of the 3D space that the projected ray passes through. Such spatial characterizations may allow the trapped support detection engine 110 to efficiently and intelligently perform intersection checks between the given surface mesh and any mesh cubes that projected rays pass through. Characterizations of bounding cubes that project rays pass through may also indicate that the given surface mesh has linear access to an object exterior, a determinative indication in the trapped support detection process.

Examples of cube characterizations used during spatially-aware detection of trapped support are described next in FIGS. 4 and 5.

Figure 4:
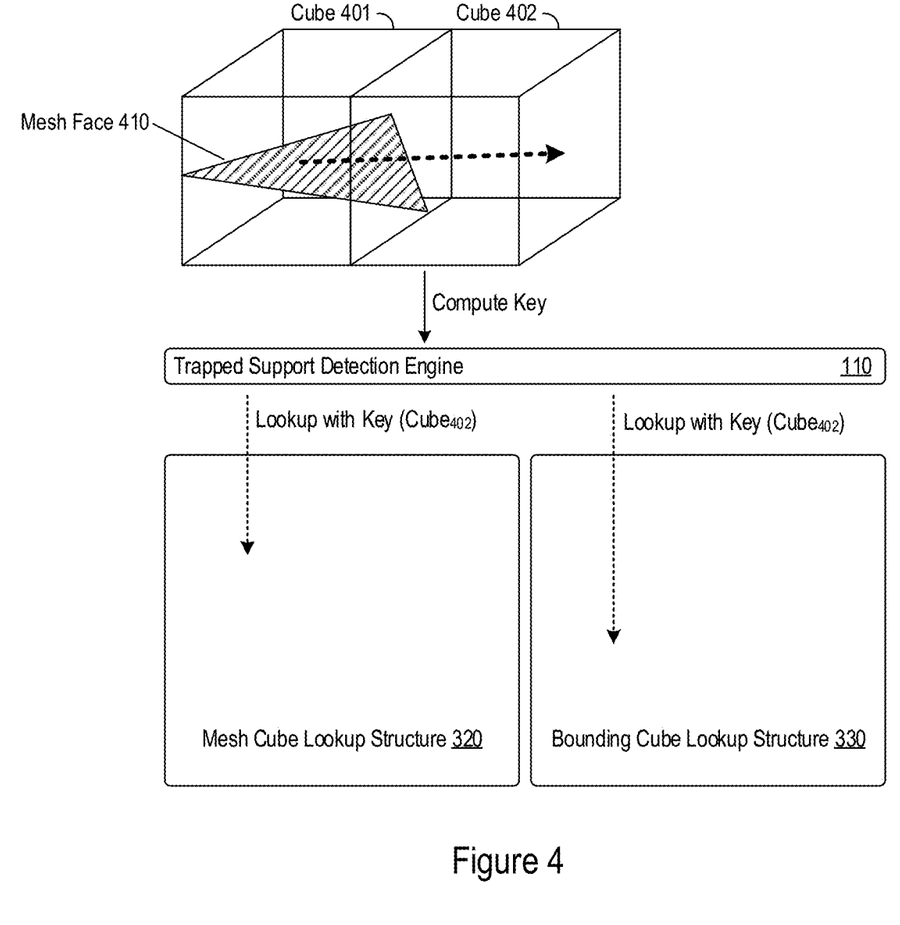
FIG. 4 shows an example cube characterization by the trapped support detection engine to support spatially-aware detections of trapped support areas.

FIG. 4 shows an example cube characterization by the trapped support detection engine 110 to support spatially-aware detections of trapped support areas. In the example shown in FIG. 4, the trapped support detection engine 110 performs a trapped support detection process for the mesh face 410. Such a trapped support detection process may include projecting a number of rays from the mesh face 410 in cube 401, for example the projected ray shown in FIG. 4 as a dotted arrow.

The trapped support detection engine 110 may characterize each successive cube that a projected ray passes through. Cube characterizations may allow the trapped support detection engine 110 to determine a particular response or calculation based on the spatial properties of the cube (e.g., a bounding cube or mesh cube). In that regard, cube characterizations may provide the trapped support detection engine 110 with spatial information by which trapped support detections are performed.

To illustrate through FIG. 4, the trapped support detection engine 110 may identify cube 402 as the next cube that the projected ray shown in FIG. 4 passes through. Such cube identification may be performed by the trapped support detection engine 110 by tracking coordinates or vector paths of the projected ray, from which the trapped support detection engine 110 may particularly identify cube 402 as the next cube in the path of the projected ray.

The trapped support detection engine 110 may characterize cube 402 as a mesh cube, a bounding cube, or an empty cube (which is neither a mesh cube nor a bounding cube). To do so, the trapped support detection engine 110 may query the bounding cube lookup structure 330, the mesh cube lookup structure 320, or both. Such queries may be performed with the cube key for cube 402, which may uniquely identify cube 402. Thus, the trapped support detection engine 110 may compute a cube key for cube 402 and use the computed cube key to perform a lookup into the bounding cube lookup structure 330, the mesh cube lookup structure 320, or both. In other words, a cube key may serve as a spatial index into the lookup structures 320 and 330, by which the trapped support detection engine 110 may spatially characterize a given cube.

In some examples, the trapped support detection engine 110 may query the bounding cube lookup structure 330 prior to querying the mesh cube lookup structure 320. Such an order may increase computational efficiency. If a given cube that a projected ray passes through is characterized as a bounding cube, then the given mesh face from which the ray is projected can be determined to have linear access to an external object area. As such, the trapped support detection engine 110 may end the trapped support detection process with a determination that the given mesh face is not part of a trapped support area. Such a determinative outcome may not be possible with a query into the mesh cube lookup structure 320, which may result in extraneous lookups were the trapped support detection engine 110 to query the mesh cube lookup structure 320 prior to querying the bounding cube lookup structure 330.

In the example shown in FIG. 4, a query/lookup by the trapped support detection engine 110 into the bounding cube lookup structure 330 using the cube key for cube 402 returns no results. That is, the bounding cube lookup structure 330 does not include an entry for the cube key of cube 402, which makes sense as cube 402 does not include any portion of the virtual bounding box 220. As such, the trapped support detection engine 110 may determine that cube 402 is not a bounding cube. In a similar manner, the trapped support detection engine 110 may perform a lookup into the mesh cube lookup structure 320 using the cube key of cube 402, which may likewise return no result since cube 402 does not include any portion of any mesh face. Accordingly, the trapped support detection engine 110 may characterize cube 402 as an empty cube.

In some implementations, the trapped support detection engine 110 may maintain the mesh cube lookup structure 320 and bounding cube lookup structure 330 in a single data structure, such as a single hash table that differentiates between mesh cube and bounding cube entries through an entry flag value (e.g., with flag values set to '1' for mesh cube entries and '0' for bounding cube entries). In such cases, the trapped support detection engine 110 need not perform multiple lookups, as a single lookup into the single data structure may be sufficient to characterize a cube as a mesh cube, a bounding cube, or an empty cube.

In a trapped support detection process, the trapped support detection engine 110 may proceed differently according the different cube characterizations. Other cube characterizations and corresponding steps in a trapped support detection process are described further in FIG. 5.

Figure 5:
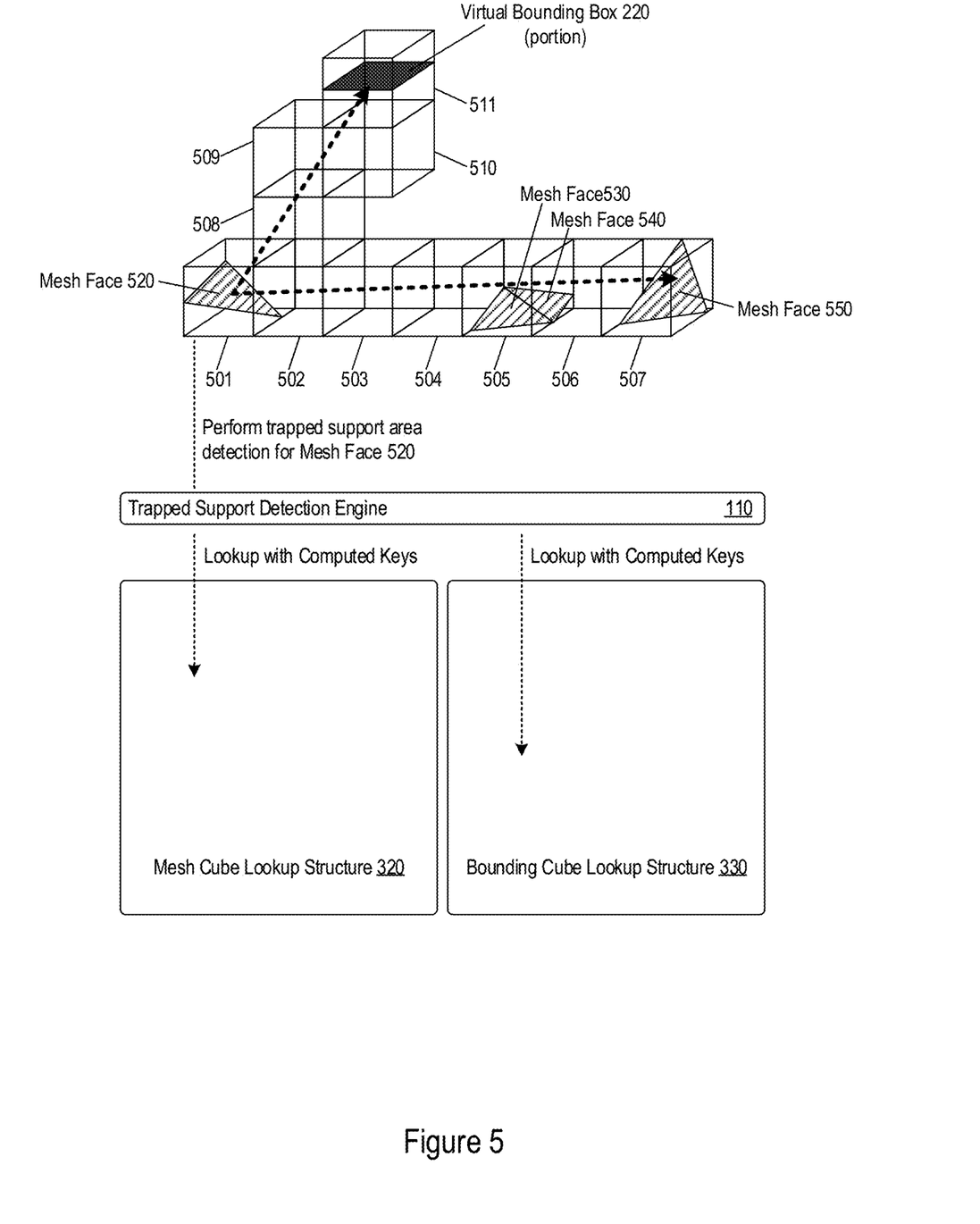
FIG. 5 further illustrates example cube characterizations by the trapped support detection engine to support spatially-aware detections of trapped support areas.

FIG. 5 further illustrates example cube characterizations by the trapped support detection engine 110 to support spatially-aware detections of trapped support areas. In the example shown in FIG. 5, cubes 501-511 are depicted for illustrative purposes, some of which include various portions of the surface mesh 210 and the virtual bounding box 220. In this example, the trapped support detection engine 110 performs a trapped support detection process for mesh face 520 located in cube 501. Two example ray projections are illustrated as well.

For one of the projected rays, the trapped support detection engine 110 may identify cube 502 as a first cube that the projected ray passes through. Similar to the example for cube 402 described in FIG. 4, the trapped support detection engine 110 may characterize cube 502 as an empty cube, as lookup(s) into the mesh cube lookup structure 320 and the bounding cube lookup structure 330 may return no result. Moving to the next cube in the path of the projected ray, the trapped support detection engine 110 may next characterize cube 503 as an empty cube, and next characterize cube 504 as an empty cube as well.

Turning to cube 505 (the next cube in the path of the projected ray), the trapped support detection engine 110 may characterize cube 505 as a mesh cube. In this case, the trapped support detection engine 110 may compute a cube key for cube 505 and use the computed cube key as a lookup key or index into the mesh cube lookup structure 320. Such a query may return an entry in the mesh cube lookup structure 320 since cube 505 includes portions from multiple mesh faces, in particular, mesh face 530 and mesh face 540 shown in FIG. 5. That is, by using the cube key for cube 505 to index into the mesh cube lookup structure 320, the trapped support detection engine 110 may determine particular spatial characteristics located in cube 505 relevant to the detection of trapped support areas. In this case, the trapped support detection engine 110 may identify mesh faces in cube 505 that can potentially block the projected ray (and thus block access from mesh face 520 to an external object area).

Characterization of a 3D cube as a mesh cube does not necessarily mean that a projected ray is trapped or blocked by the mesh face(s) located in the mesh cube. The mesh cube characterizations may provide spatially-relevant information for intersection checks, namely the particular mesh faces located in a cube that can potentially block a mesh face from linear access to an external object area. To determine whether any mesh face(s) located in cube 505 (an identified mesh cube) actually block the mesh face 520 from linear access to an external object area, the trapped support detection engine 110 performs intersection checks. In doing so, the trapped support detection engine 110 need not perform intersection checks for every other mesh face in the surface mesh 210 to detect collisions with the projected ray. Instead, the trapped support detection engine 110 may perform the intersection checks on selected mesh faces, i.e., the particular mesh faces located in the characterized mesh cube.

To illustrate through the example in FIG. 5, the entry in the mesh cube lookup structure 320 for cube 505 may identify mesh face 530 and mesh face 540 as included (at least in part) in cube 505. Accordingly, the trapped support detection engine 110 may perform an intersection check between mesh face 520 and mesh face 530 along the projected ray and also for mesh face 540 also along the projected ray. Any available intersection algorithm or intersection application program interface (API) is suitable for such intersection computations. In FIG. 5, the trapped support detection engine 110 performs the intersection checks and determines that the ray projected from the mesh face 520 does not intersect mesh face 530 and does not intersect mesh face 540. Since no intersection actually occurs, the trapped support detection engine 110 may continue analysis of cubes along the path of the projected ray.

Next, the trapped support detection engine 110 may characterize cube 506 as an empty cube and cube 507 as a mesh cube. For cube 507, the trapped support detection engine 110 may determine that mesh face 550 is included (e.g., located) in cube 507 and perform an intersection check. This time, the trapped support detection engine 110 may determine that an intersection occurs, and determine that mesh face 550 blocks/traps mesh face 520 along the projected ray. Such a trapping determination is made by the trapped support detection engine 110 in a spatially-aware manner. That is, for the projected ray in this particular example, the trapped support detection engine 110 performs a total of three (3) intersection checks, for mesh faces 530, 540, and 550 respectively. In comparison to brute-force or other trapped support detection techniques that may require significantly more intersection computations, the spatially-aware trapped support detections described herein may be performed with lesser resource consumption, higher efficiency, and in reduced amount time.

For a given surface mesh, the trapped support detection engine 110 may project multiple rays to detect access (or lack of access) to external object areas. In the example shown in FIG. 5, the trapped support detection engine 110 also projects another ray from mesh face 520 that passes through cubes 508, 509, and 510, each of which are characterized as empty cubes in a consistent manner as described herein. For the next cube in the path of the projected ray, the trapped support detection engine 110 characterizes cube 511 as a bounding cube. This may be responsive to a lookup into the bounding cube lookup structure 330 returning an entry for cube 511 (as a portion of the virtual bounding box 220 is located in cube 511). Responsive to such a characterization, the trapped support detection engine 110 may determine that mesh face 520 (or at least the point on mesh face 520 that this ray is projected from) is not part of a trapped support area. Thus, bounding box characterizations may provide a spatial context for the trapped support detections, by providing the trapped support detection engine 110 a determinative indication of access to an external object area.

Thus, the trapped support detection engine 110 may perform trapped support detections in a spatially-aware manner. Characterizations of various 3D spaces during the trapped support detection process may allow the trapped support detection engine 110 to discriminately perform intersection checks on relevant mesh faces, thus providing a capability for spatially-aware intersection computations. Moreover, spatial indexing of cubes using cube keys may provide efficient, speedy mechanisms to characterize various portions of a 3D space, which may also increase computational efficiencies.

Figure 6:
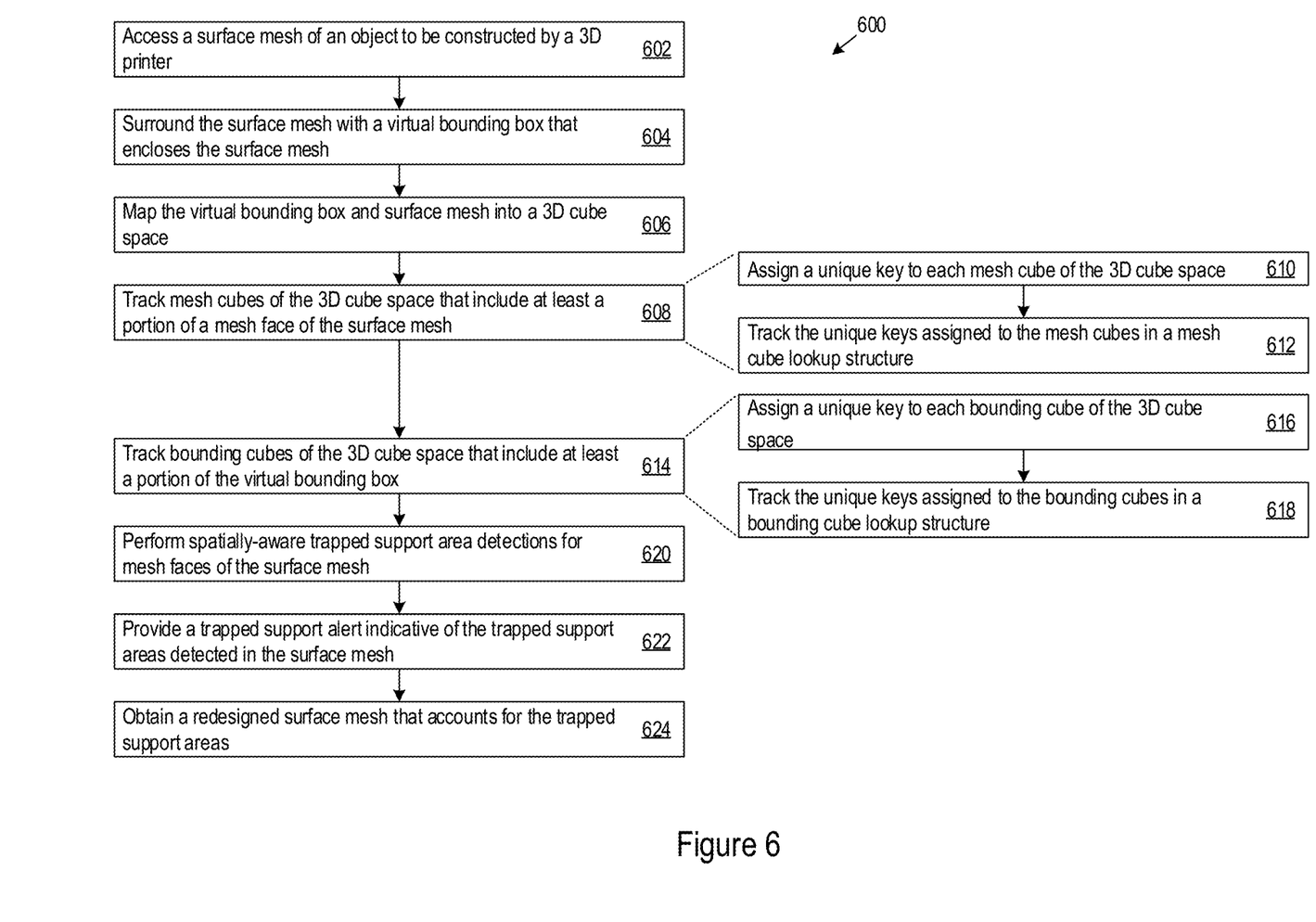
FIG. 6 shows an example of logic that a system may implement to support spatially-aware detection of trapped support areas in 3D printing.

FIG. 6 shows an example of logic 600 that a system may implement to support spatially-aware detection of trapped support areas in 3D printing. For example, the CAD system 100 may implement the logic 600 as hardware, executable instructions stored on a machine-readable medium, or as a combination of both. The CAD system 100 may implement the logic 600 through the mesh access engine 108 and the trapped support detection engine 110, through which the CAD system 100 may perform or execute the logic 600 as a method to detect trapped support areas in a surface mesh. The following description of the logic 600 is provided using the mesh access engine 108 and the trapped support detection engine 110 as examples. However, various other implementation options by the CAD system 100 are possible.

In implementing the logic 600, the mesh access engine 108 may access a surface mesh of an object to be constructed by a 3D printer (602). In implementing the logic 600, the trapped support detection engine 110 may surround the surface mesh with a virtual bounding box that encloses the surface mesh (604) and map the virtual bounding box and the surface mesh into a 3D cube space (606), or another 3D space subdivided with any other suitable shape.

To support spatial-aware detection of trapped support areas, the trapped support detection engine 110 may track mesh cubes of the 3D cube space that include at least a portion of a mesh face of the surface mesh (608). Such tracking may include the trapped support detection engine 110 assigning a unique key to each mesh cube of the 3D cube space (610) and tracking the unique keys assigned to the mesh cubes in a mesh cube lookup structure (612), e.g., as described herein. The unique keys may be cube keys computed by concatenating cube coordinates or application of a key generation algorithm that uniquely identifies each cube in the 3D cube space.

The trapped support detection engine 110 may also track bounding cubes of the 3D cube space that include at least a portion of the virtual bounding box (614). Such tracking may include the trapped support detection engine 110 assigning a unique key to each bounding cube of the 3D cube space (616) and tracking the unique keys assigned to the bounding cubes in a bounding cube lookup structure (618).

The trapped support detection engine 110 may perform spatially-aware trapped support detections for mesh faces of the surface mesh (620). Such trapped support detections may be spatially-aware in that cubes in the 3D space are characterized as mesh cubes, bounding cubes, or empty cubes. Such cube characterizations may allow the trapped support detection engine 110 to discriminately or selectively perform intersection checks with relevant mesh faces that could potentially block or trap other mesh faces. The unique cube keys may, in effect, provide spatial indexing capabilities to efficiently characterize 3D spaces that projected rays pass through. Such spatially-aware detection features are described in greater detail throughout the present disclosure, including below in FIG. 7.

Through the trapped support detections, the trapped support detection engine 110 may detect various trapped support areas in the object. In some implementations, the trapped support detection engine 110 may provide a trapped support alert indicative of the trapped support areas detected in the surface mesh (622). Such an alert may be presented visually through a graphical user interface, or in the form of a trapped support area report. The alert may identify the specific locations of the trapped support areas in the surface mesh, and request a user to address the trapped support areas for proper 3D printing. The trapped support detection engine 110 may later obtain a redesigned surface mesh that accounts (e.g., eliminates) the trapped support areas (624). That is, the trapped support detection engine 110 may obtain a redesign surface mesh that no longer includes any trapped support areas.

Figure 7:
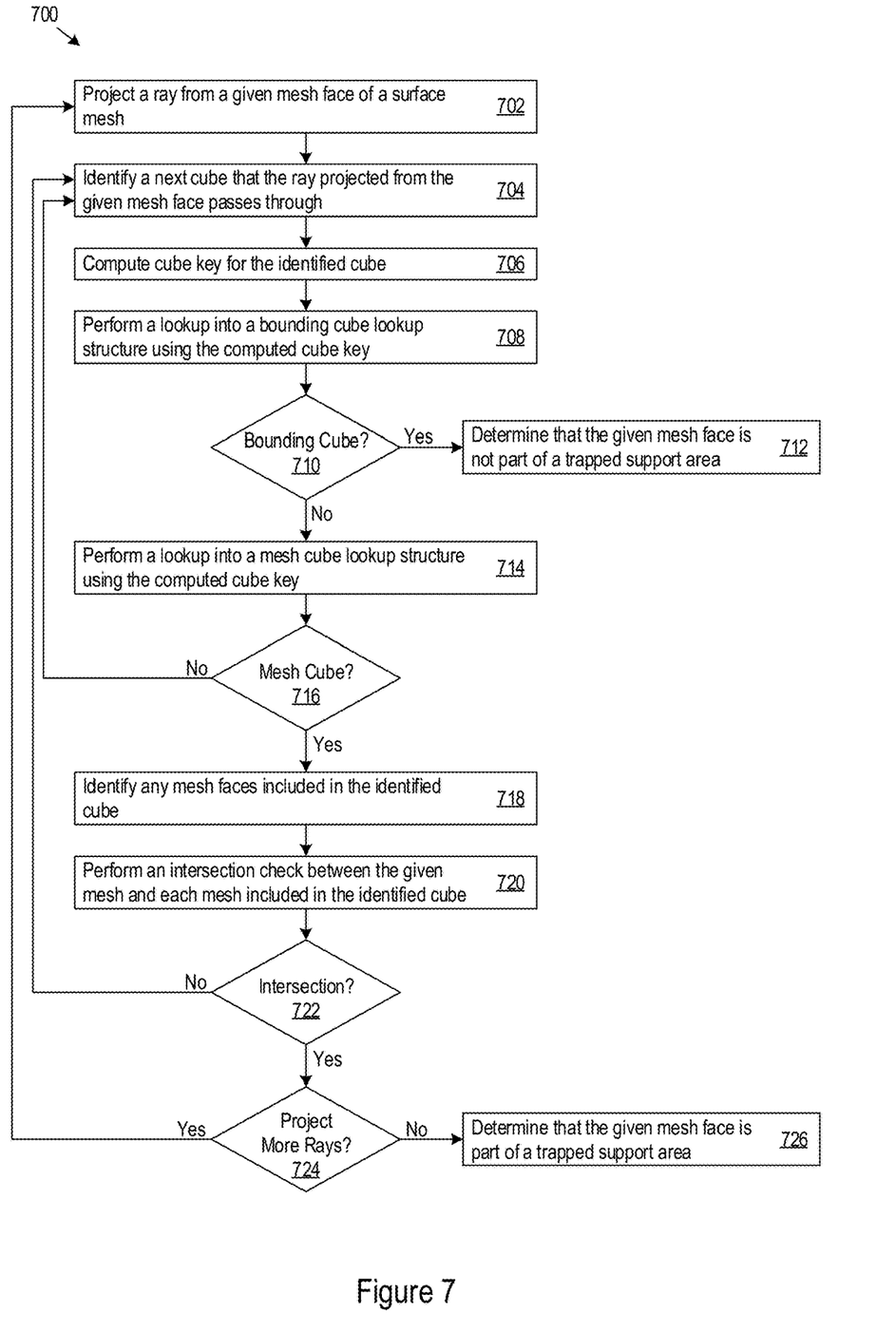
FIG. 7 shows an example of logic that a system may implement to perform trapped support detections for mesh faces of a surface mesh.

FIG. 7 shows an example of logic 700 that a CAD system 100 may implement to perform trapped support detections for mesh faces of a surface mesh. The following description of the logic 700 is provided using the trapped support detection engine 110 as an example implementation. However, various other implementation options by the CAD system 100 are possible, including as hardware, executable instructions stored on a machine-readable medium, or as a combination of both. The logic 700 shown in FIG. 7 provides an example of how a CAD system 100 may perform a trapped support detection for a particular mesh face of an object. The logic 700 may be repeated for any number of mesh faces in a surface mesh (e.g., all mesh faces) to adequately analyze the modeled object for trapped support areas.

In implementing the logic 700, the trapped support detection engine 110 may project a ray from a given mesh face of a surface mesh (702). The projected ray may start from the particular cube that the given mesh face is located in. Next, the trapped support detection engine 110 may identify a next cube that the ray projected from the given mesh face passes through (704) and compute a cube key for the identified cube (706). Then, the trapped support detection engine 110 may characterize the identified cube using the computed cube key and respond according to the cube characterization.

For instance, the trapped support detection engine 110 may perform a lookup into a bounding cube lookup structure using the computed cube key (708). The cube key may index into the bounding cube lookup structure in an efficient manner to allow for speedy bounding cube characterizations. As described herein, the trapped support detection engine 110 may characterize the identified cube as a bounding cube (710), doing so based on a result of the lookup using the computed cube key of the identified cube. If the lookup returns a result (e.g. results in a hit in the lookup structure), the trapped support detection engine 110 may characterize the identified cube as a bounding cube and, in response, determine that the given mesh face is not part of a trapped support area (712). Such a determination may end the trapped support detection process for the given mesh face.

Responsive to a characterization that the identified cube is not a bounding box cube, the trapped support detection engine 110 may perform a lookup into a mesh cube lookup structure using the computed cube key (714). The trapped support detection engine 110 may characterize the identified cube as a mesh cube (716), doing so based on a result of the lookup using the computed cube key of the identified cube. When the lookup into the mesh cube lookup structure results in a miss, the trapped support detection engine 110 may characterize the identified cube as an empty cube and identify a next cube that that project ray passes through (returning to 704). If the lookup returns a result (e.g. results in a hit in the mesh cube lookup structure), the trapped support detection engine 110 may characterize the identified cube as a mesh cube. Responsive to such a mesh cube characterization, the trapped support detection engine 110 may identify any meshes included (at least in part) in the identified cube (718), e.g., as specified in the entry stored in the mesh cube lookup structure for the identified cube.

Next, the trapped support detection engine 110 may perform an intersection check between the given mesh face and each mesh included (e.g., at least partially located) in the identified cube along the projected ray (720). The trapped support detection engine 110 may obtain results from the intersection check(s) (722). Responsive to the intersection check(s) indicating that the ray projected from the given mesh face does not intersect any mesh included in the identified cube, the trapped support detection engine 110 continue to a next cube that the ray passes through (returning to 704).

Responsive to the intersection check indicating that the ray projected from the given mesh face intersects a mesh included in the identified cube, the trapped support detection engine 110 may determine that the given mesh face is trapped along the projected ray and determine whether to project other rays from the given mesh face along different directions (724). The number of rays (and corresponding ray directions) may be a configurable parameter set by a user or other system administrator. The trapped support detection engine 110 may continue to project rays from the given mesh face until such parameters are satisfied (returning to 702) or a projected ray passes through a bounding cube. When no projected ray has passed through a bounding cube and the threshold number of rays have been projected from the given mesh face, the trapped support detection engine 110 may determine that the given mesh face is part of a trapped support area (726).

Figure 8:
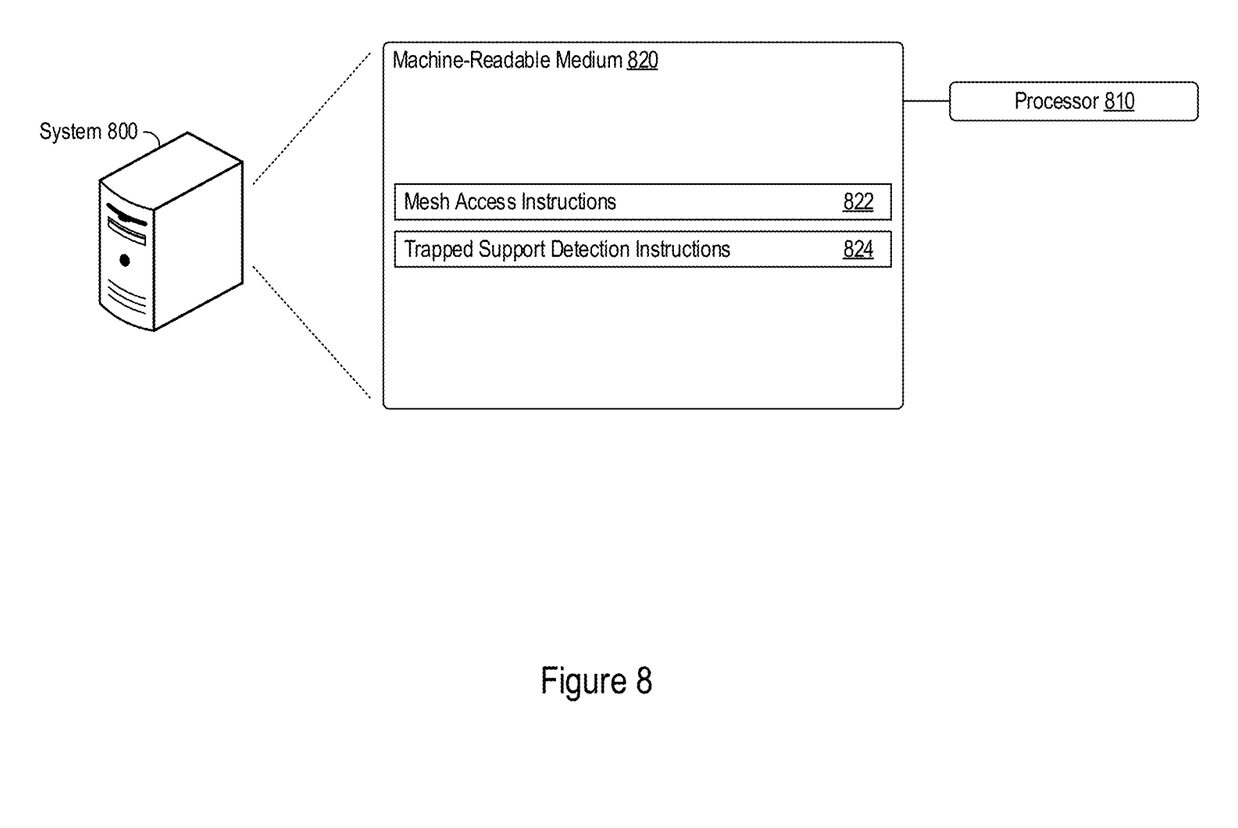
FIG. 8 shows an example of a system that supports spatially-aware detection of trapped support areas in 3D printing.

FIG. 8 shows an example of a system 800 that supports spatially-aware detection of trapped support areas in 3D printing. The system 800 may include a processor 810, which may take the form of a single or multiple processors. The processor(s) 810 may include a central processing unit (CPU), microprocessor, or any hardware device suitable for executing instructions stored on a machine-readable medium. The system 800 may include a machine-readable medium 820. The machine-readable medium 820 may take the form of any non-transitory electronic, magnetic, optical, or other physical storage device that stores executable instructions, such as the mesh access instructions 822 and the trapped support detection instructions 824 shown in FIG. 8. As such, the machine-readable medium 820 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 800 may execute instructions stored on the machine-readable medium 820 through the processor 810. Executing the instructions may cause the system 800 (or any other CAD system) to perform any of the trapped support detection features described herein, including according to any of the features with respect to the mesh access engine 108, the trapped support detection engine 110, or a combination of both. For example, execution of the mesh access instructions 822 by the processor 810 may cause the system 800 to access a surface mesh of an object to be constructed by a 3D printer.

Execution of the trapped support detection instructions 824 by the processor 810 may cause the system 800 to detect trapped support areas in the surface mesh including by surrounding the surface mesh with a virtual bounding box that encloses the surface mesh; mapping the virtual bounding box and surface mesh into a 3D cube space; tracking mesh cubes of the 3D cube space that include at least one mesh face of the surface mesh; tracking bounding cubes of the 3D cube space that include at least a portion of the virtual bounding box; and for a given mesh face of the surface mesh, determining whether the given mesh face is part of a trapped support area by projecting a ray from the given mesh face and assessing the given mesh as part of a trapped support area based on the ray passing through a mesh cube or a bounding cube.

Execution of the trapped support detection instructions 824 by the processor 810 may further cause the system 800 to provide a trapped support alert indicative of the trapped support areas detected in the surface mesh and obtain a redesigned surface mesh that accounts for the trapped support areas. Additional or alternative features described herein may be implemented via the mesh access instructions 822, trapped support detection instructions 824, or a combination of both.

The systems, methods, devices, and logic described above, including the mesh access engine 108 and the trapped support detection engine 110, may be implemented in many different ways in many different combinations of hardware, logic, circuitry, and executable instructions stored on a machine-readable medium. For example, the mesh access engine 108, the trapped support detection engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the mesh access engine 108, the trapped support detection engine 110, or combinations thereof.

The processing capability of the systems, devices, and engines described herein, including the mesh access engine 108 and the trapped support detection engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computer-aided design (CAD) system:
accessing a surface mesh of an object to be constructed by a 3-dimensional (3D) printer;
detecting a trapped support areas in the surface mesh in that detected trapped support areas do not have linear access to an opening in the surface mesh, wherein detecting comprises:
surrounding the surface mesh with a virtual bounding box that encloses the surface mesh;
mapping the virtual bounding box and surface mesh into a 3D cube space;
tracking mesh cubes of the 3D cube space that include at least a portion of a mesh face of the surface mesh;
tracking bounding cubes of the 3D cube space that include at least a portion of the virtual bounding box; and
for a given mesh face of the surface mesh, determining whether the given mesh face is part of a trapped support area by:
projecting a ray from the given mesh face; and
assessing the given mesh face as part of a trapped support area based on the ray passing through a mesh cube or a bounding cube, including by, for a given cube that the ray passes through:
determining that the given cube is a mesh cube;
performing an intersection check between the given mesh face and any mesh faces at least partially included in the given cube;
responsive to the intersection check indicating that the ray projected from the given mesh face does not intersect any mesh face included in the given cube, continuing to a next cube that the ray passes through; and
responsive to the intersection check indicating that the ray projected from the given mesh face intersects a mesh face included in the given cube, projecting another ray from the given mesh face; and providing a trapped support alert indicative of the trapped support areas detected in the surface mesh; and obtaining a redesigned surface mesh that accounts for the trapped support areas.

2. The method of claim 1, wherein assessing the given mesh face as part of a trapped support area based on the ray passing through a mesh cube or a bounding cube comprises, for a given cube that the ray passes through:

determining that the given cube is a bounding cube and, in response, determining that the given mesh face is not part of a trapped support area.

3. The method of claim 1, wherein assessing the given mesh face as part of a trapped support area based on the ray passing through a mesh cube or a bounding cube further comprises:

identifying that the given mesh face is part of a trapped support area when no ray projected from the given mesh face passes through a bounding cube.

4. The method of claim 1, wherein mapping the virtual bounding box and the surface mesh to the 3D cube space comprises setting cube parameters of the 3D cube space to be a threshold size proportional to a granularity of the surface mesh.

5. The method of claim 1, wherein:

tracking the mesh cubes of the 3D cube space comprises:
assigning a unique key to each mesh cube of the 3D cube space; and
tracking the unique keys assigned to the mesh cubes in a mesh cube lookup structure; and tracking the bounding cubes of the 3D cube space comprises:
assigning a unique key to each bounding cube of the 3D cube space; and
tracking the unique keys assigned to the bounding cubes in a bounding cube lookup structure different from the mesh cube lookup structure.

6. The method of claim 5, wherein assessing the given mesh face as part of a trapped support area based on the ray passing through a mesh cube or a bounding cube comprises, for a given cube that the ray passes through:

characterizing the given cube by performing a lookup into the mesh cube lookup structure, the bounding cube lookup structure, or both.

7. The method of claim 6, wherein assessing the given mesh as part of a trapped support area based on the ray passing through a mesh cube or a bounding cube further comprises:

performing an intersection check for selected mesh faces of the surface mesh based on the ray passing through a cube characterized as a mesh cube.

8. The method of claim 1, wherein assessing the given mesh as part of a trapped support area based on the ray passing through a mesh cube or a bounding cube comprises:

selectively performing an intersection check for some but not all of the mesh faces of the surface mesh based on the ray projected from the given mesh face passing through a mesh cube.

9. A system comprising:

a mesh access engine configured to access a surface mesh of an object to be constructed by a 3-dimensional (3D) printer; and a trapped support detection engine configured to:
map the surface mesh into a 3D cube space;
track mesh cubes of the 3D cube space that include at least a portion of a mesh face of the surface mesh;
determine whether a given mesh face of the surface mesh is part of a trapped support area by selectively performing intersection checks to other mesh faces of the surface mesh based on rays projected from the given mesh face passing through mesh cubes of the 3D cube space, including by assessing the given mesh face as part of a trapped support area based on a given ray projected from the given mesh faces passes through a mesh cube or a bounding cube in the 3D cube space, comprising, for a given cube that the given ray passes through:
determining that the given cube is a mesh cube that includes a portion of a mesh face of the surface mesh;
performing an intersection check between the given mesh face and any mesh faces at least partially included in the given cube;
responsive to the intersection check indicating that the given ray projected from the given mesh face does not intersect any mesh face included in the given cube, continuing to a next cube that the ray passes through; and
responsive to the intersection check indicating that the given ray projected from the given mesh face intersects a mesh face included in the given cube, projecting another ray from the given mesh face; and provide a trapped support alert indicative of a trapped support area detected in the surface mesh; and obtain a redesigned surface mesh that accounts for the trapped support area.

10. The system of claim 9, wherein the trapped support detection engine is further configured to:

surround the surface mesh with a virtual bounding box that encloses the surface mesh;

track bounding cubes of the 3D cube space that include at least a portion of the virtual bounding box; and wherein the trapped support detection engine is configured to determine the given mesh face of the surface mesh is not part of a trapped support area responsive to a determination that a ray projected from the given mesh face passes through a bounding cube.

11. The system of claim 10, wherein the trapped support detection engine is configured to track the mesh cubes of the 3D cube space by:

assigning a unique key to each mesh cube of the 3D cube space; and tracking the unique keys assigned to the mesh cubes in a mesh cube lookup structure; and wherein the trapped support detection engine is configured to track the bounding cubes of the 3D cube space by:

assigning a unique key to each bounding cube of the 3D cube space; and tracking the unique keys assigned to the bounding cubes in a bounding cube lookup structure different from the mesh cube lookup structure.

12. The system of claim 11, wherein the trapped support detection engine is configured to determine whether the given mesh face is part of a trapped support area by characterizing a given cube that a ray projected from the given mesh face passes through by performing a lookup into the mesh cube lookup structure, the bounding cube lookup structure, or both.

13. The system of claim 11, wherein the trapped support detection engine is configured to determine whether the given mesh face is part a trapped support area by performing an intersection check for selected mesh faces of the surface mesh based on the ray passing through a cube characterized as a mesh cube.

14. A non-transitory machine-readable medium comprising instructions that, when executed by a processor, cause a system to:
  access a surface mesh of an object to be constructed by a 3-dimensional (3D) printer;
  detect trapped support areas in the surface mesh in that detected trapped support area do not have linear access to an opening in the surface mesh, including by:
    surrounding the surface mesh with a virtual bounding box that encloses the surface mesh;
    mapping the virtual bounding box and surface mesh into a 3D cube space;
    tracking mesh cubes of the 3D cube space that include at least a portion of a mesh face of the surface mesh;
    tracking bounding cubes of the 3D cube space that include at least a portion of the virtual bounding box; and
    for a given mesh face of the surface mesh, determining whether the given mesh face is part of a trapped support area by:
      projecting a ray from the given mesh face; and
      assessing the given mesh face as part of a trapped support area based on the ray passing through a mesh cube or a bounding cube, including by, for a given cube that the ray passes through:
        determining that the given cube is a mesh cube;
        performing an intersection check between the given mesh face and any mesh faces at least partially included in the given cube;
        responsive to the intersection check indicating that the ray projected from the given mesh face does not intersect any mesh face included in the given cube, continuing to a next cube that the ray passes through; and
        responsive to the intersection check indicating that the ray projected from the given mesh face intersects a mesh face included in the given cube, projecting another ray from the given mesh face; and
  provide a trapped support alert indicative of the trapped support areas detected in the surface mesh; and
  obtain a redesigned surface mesh that accounts for the trapped support areas.

15. The non-transitory machine-readable medium of claim 14, wherein the instructions to track the mesh cubes of the 3D cube space comprise instructions that cause the system to:
  assign a unique key to each mesh cube of the 3D cube space; and
  track the unique keys assigned to the mesh cubes in a mesh cube lookup structure; and
  wherein the instructions to track the bounding cubes of the 3D cube space comprise instructions that cause the system to:
  assign a unique key to each bounding cube of the 3D cube space; and
  track the unique keys assigned to the bounding cubes in a bound cube lookup structure different from the mesh cube lookup structure.

16. The non-transitory machine-readable medium of claim 15, wherein the instructions to assess the given mesh face as part of a trapped support area based on the ray passing through a mesh cube or a bounding cube comprise instructions that cause the system to, for a given cube that the ray passes through:
  characterize the given cube by performing a lookup into the mesh cube lookup structure, the bounding cube lookup structure, or both.

17. The non-transitory machine-readable medium of claim 16, wherein the instructions to assess the given mesh face as part of a trapped support area based on the ray passing through a mesh cube or a bounding cube further comprise instructions that cause the system to:
  perform an intersection check for selected mesh faces of the surface mesh based on the ray passing through a cube characterized as a mesh cube.

18. The non-transitory machine-readable medium of claim 14, wherein the instructions to assess the given mesh face as part of a trapped support area based on the ray passing through a mesh cube or a bounding cube comprise instructions that cause the system to, for a given cube that the ray passes through:
  determine that the given cube is a bounding cube and, in response, determine that the given mesh face is not part of a trapped support area.

19. The non-transitory machine-readable medium of claim 14, wherein the instructions to assess the given mesh face as part of a trapped support area based on the ray passing through a mesh cube or a bounding cube further comprise instructions that cause the system to:
  identify that the given mesh face is part of a trapped support area when no ray projected from the given mesh face passes through a bounding cube.

* * * * *